UNITED STATES PATENT OFFICE.

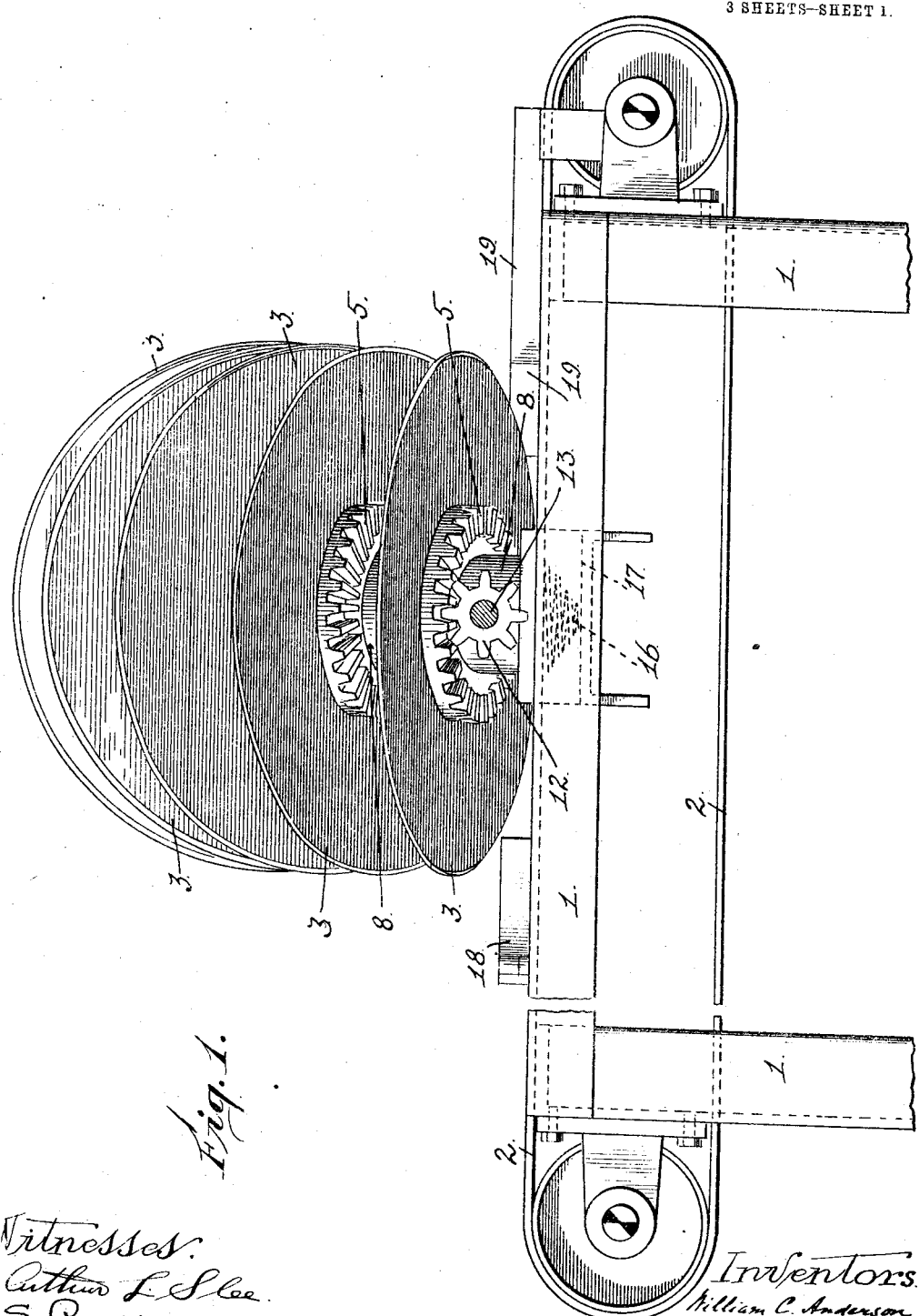

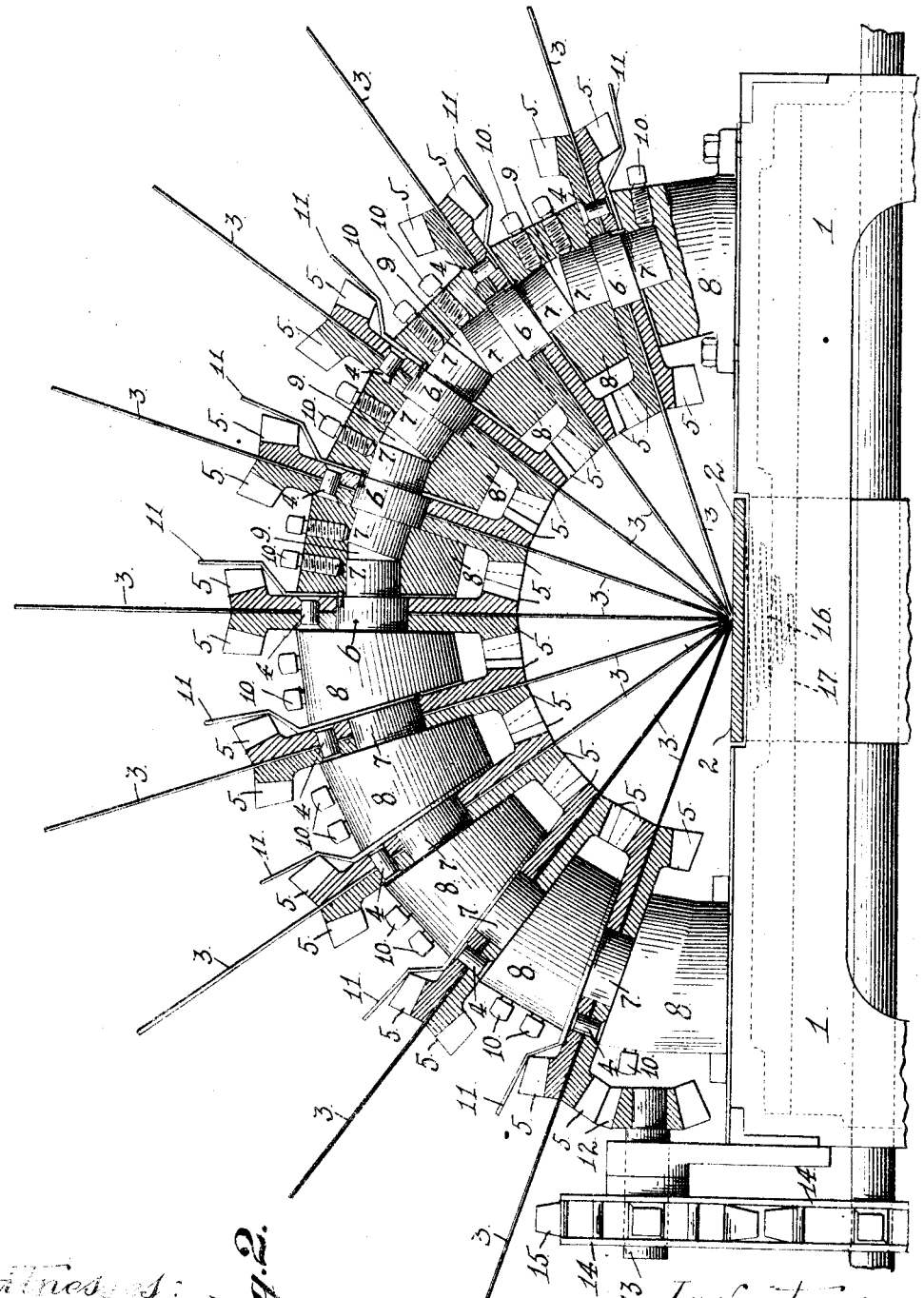

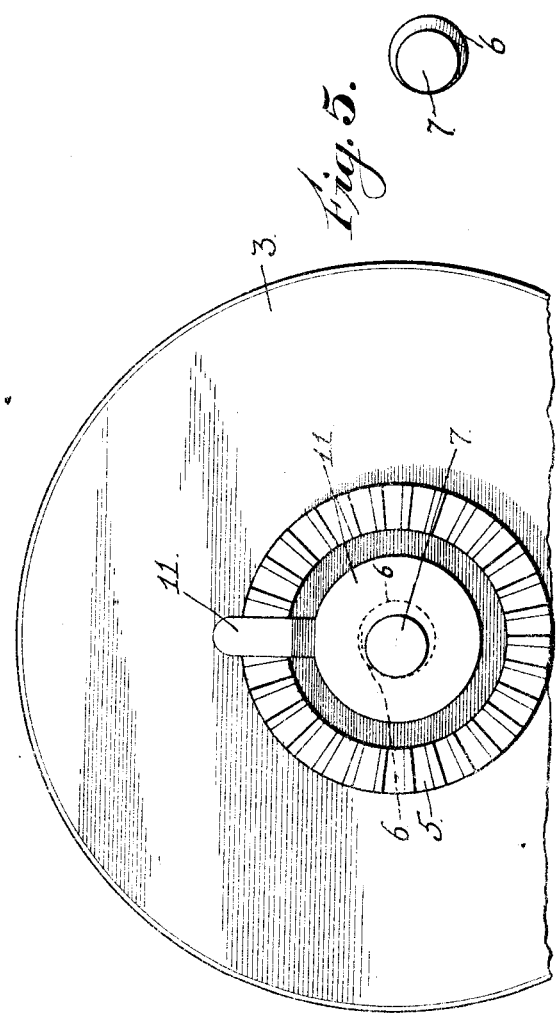
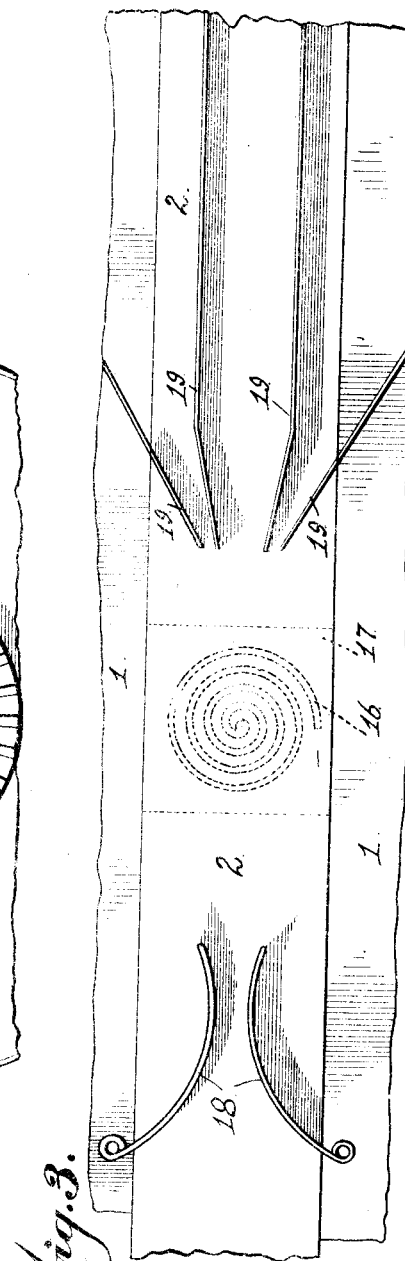

WILLIAM C. ANDERSON AND ALBERT R. THOMPSON, OF SAN JOSE, CALIFORNIA, ASSIGNORS TO ANDERSON-BARNGROVER MFG. CO., OF SAN JOSE, CALIFORNIA, A CORPORATION OF CALIFORNIA.

SLICING-MACHINE.

1,062,378.     Specification of Letters Patent.     Patented May 20, 1913.

Application filed May 3, 1911. Serial No. 624,816.

*To all whom it may concern:*

Be it known that we, WILLIAM C. ANDERSON and ALBERT R. THOMPSON, citizens of the United States, residing at San Jose, in the county of Santa Clara and State of California, have invented certain new and useful Improvements in Slicing-Machines, of which the following is a specification.

Our invention relates to that class of machines for slicing fruits, vegetables and the like, in which cutters are assembled in semi-circular series and rotate in radial planes above a feeder which travels under the convergent lower edges of the cutters.

Our invention consists in means for mounting and supporting the cutters; means for relatively adjusting them; means for driving them; means for yieldingly presenting the fruit to the cutters and means for assorting the several slices, all as we shall hereinafter fully describe, together with the objects sought and attained by our several improvements.

Referring to the accompanying drawings:—Figure 1 is a side elevation of our slicing machine. Fig. 2 is a cross sectional view, partly in elevation, of the cutters, showing the manner of mounting and driving them. Fig. 3 is a fragmentary plan view of the feeder belt, showing the centering guides, the cushioning spring and the assorting guides. Fig. 4 is a side view of one of the cutters, showing the mounting on the shaft, and the adjusting lever, the dotted lines indicating the eccentricity of the shaft journal. Fig. 5 is an end view of one of the shafts 7, showing the eccentricity of its journal portion 6.

1 is a frame on which is mounted the traveling feeder belt or carrier 2.

3 are the cutters, in the form of metallic disks. They are assembled in a semi-circular series, and each cutter lies and rotates in a radial plane, their lower convergent edges lying just above the feeder 2.

Each cutter has secured to each of its faces as by riveting as seen at 4, an annular gear 5, and each cutter with its gears is mounted to rotate upon the journal portion 6 of a shaft 7. There is one such shaft 7 for each cutter.

8 are the supporting blocks assembled in semi-circular series. A terminal one of these blocks lies upon the frame 1 on one side and the other terminal block lies upon the frame at the other side; the remaining blocks lie between the cutters, and inside of the peripheries of the gears. Each block has a hole 9 in it from each side and into these holes fit the shafts 7 and are fixed therein by set screws 10. By these means the cutters are supported by relatively extensive bearings, affording precision in rotation, rigidity in operation and stiffness against any strains which they may have to bear. Though the cutters are necessarily of very thin metal, the gears about their centers stiffen them, and afford ample journal bearing.

In order to set or readjust any cutter to its proper position we make provision as follows: The journal portions 6 of the shafts 7, though peripherally circular are eccentric to their shafts, and to each journal portion is secured a lever 11. By loosening the set screws 10 which hold any given shaft 7 in its support in the blocks 8, and by then turning said shaft on its axis by means of the lever 11, the cutter of said shaft will be raised and lowered to the desired position, and thereupon by resetting the screws 10, said cutter will be held in the position to which it has been adjusted. Thus all the cutters of the series may be adjusted to and kept in proper relative position by simple and effective means.

The rotation of the cutters is provided for as follows: The annular gears 5 intermesh between the cutters so that all are driven. A terminal one of these gears meshes with a pinion 12 on a driving shaft 13, which is driven in suitable manner, as, for example, by a chain 14 from the main driving shaft of the feeder to a sprocket 15 on the shaft 13. Thus the cutters are driven by positive and efficient connections of simple character, and which give uniformity and steadiness of operation, this being of prime importance for neat, clean work, especially in slicing as delicate fruit as peaches.

In order that the cutters shall not suffer injury from foreign or hard bodies which may be accidentally presented to them, such, for example, as a peach stone or piece thereof which, with all ordinary care, is sometimes left with the peach, we provide for the presentation of the articles to be sliced, to the cutters with a yielding pressure, which is sufficient under normal conditions for the cutting effect, but which in the presence of a hard substance will permit said substance to pass without injuring the cutters. This result is effected by placing a cushion bearing under the feeder 2 where it passes under the grouped lower edges of the cutters. In practice we prefer a spring 16 for the cushion, said spring being in the shape of a conical helix with its base upward and its apex downward and supported upon a bracket 17. The base of the spring 16 holds the feeder 2 in normally operative position relatively to the cutters, with a pressure sufficient for the slicing effect, but insufficient for the contact of a hard body with the cutters. The result is that when such a body is presented, the feeder will yield downwardly and thus permit the hard body to pass without injury to the cutters.

18 are centering guides secured to the frame 1, and so disposed as to direct the articles to be sliced to alinement with the cutters. These guides are best formed of springy material to insure accuracy.

Upon the frame, beyond the cutters and overlying the feeder are the slice-sorting guides 19. We have here shown four of these, the ends nearest the cutters being bent into a position to receive and sort by separation any given slices desired. To understand the object here intended, we will now describe the operation of the machine as being used to slice peaches.

The peaches having been halved and the stones removed; and the halves having been divested of their skins, all in the manner well known to the art, said halves are placed upon the feeder flat side down and in general single file. This file is insured and maintained and is properly centered by the guides 18. In this position the hemispheres are carried to and passed through the cutters, with the effect of slicing them in radial segments. If a stone or a part of one should be encountered, the feeder will yield and it will pass without injury to the cutters. The outermost slice on each side is obviously less perfect and less desirable, one of its sides being more or less ragged as a result of its exposure and various contacts since the original halving. It is well to sort out these slices for proper disposition. This is done by the outermost of the guides 19, on each side, beyond which these slices fall and by which they are separated from the other slices and directed to different destinations. In practice, the next slice or couple of slices are considered slightly inferior to the group of middle slices and they too should be sorted out. This is done by the inner guides 19 which confine said slices between said inner guides and the outer guides. The middle group of slices are received between the inner guides and are thus kept to themselves.

Having thus described our invention what we claim as new and desire to secure by Letters Patent is—

1. In a slicing machine of the described class, the combination of a frame; a plurality of spaced cutting disks assembled in semi-circular series and in radial planes; a plurality of shafts, one shaft in the axis of each cutting disk; a semi-circular series of blocks the terminal ones resting on the frame and the intervening ones lying between the cutting disks, said blocks receiving and supporting the shafts of said disks; and means for presenting the material to and passing it between the convergent lower portions of the cutting disks.

2. In a slicing machine of the described class, the combination of a frame; a plurality of spaced cutting disks assembled in semi-circular series and in radial planes; a plurality of shafts, one shaft in the axis of each cutting disk, and upon which it rotates; a semi-circular series of blocks the terminal ones resting on the frame and the intervening ones lying between the cutting disks, said blocks receiving and supporting the shafts of said disks; means for rotating all of said disks; means for fixing said shafts in said blocks; and means for presenting the material to and passing it between the convergent lower portions of the cutting disks.

3. In a slicing machine of the described class, the combination of a frame; a plurality of spaced cutting disks assembled in semi-circular series and in radial planes; a plurality of shafts one in the axis of and projecting from each side of each disk, each of said shafts having a central portion eccentric to the axis of its end portions and upon which central portion the disk is mounted; means for turning each shaft in the axis of the disk it supports, to adjust the relative position of the disk in the series; a semi-circular series of blocks the terminal ones resting on the frame and the intervening ones lying between the cutting disks, said blocks receiving and supporting the shafts of said disks; and means for presenting the material to and passing it between the convergent lower portions of the cutting disks.

4. In a slicing machine of the described class, the combination of a frame; a plurality of spaced cutting disks assembled in semi-circular series and in radial planes; a plurality of shafts one in the axis of and projecting from each side of each disk, each of said shafts having a central portion eccentric to the axis of its end portions and upon which central portion the disk is mounted; means for turning each shaft in the axis of the disk it supports, to adjust the relative position of the disk in the series; a semi-circular series of blocks the terminal ones resting on the frame and the intervening ones lying between the cutting disks and within their peripheries, said blocks receiving and supporting the projecting ends of the disk shafts; releasable means for fixing the shaft ends in said blocks; means for rotating all of said disks; and means for presenting the material to and passing it between the convergent lower portions of the cutting disks.

5. In a slicing machine of the described class, the combination of a plurality of spaced cutting disks assembled in semicircular series and in radial planes; annular gears secured on each face of each cutting disk around its center, adjacent gears intermeshing; means for rotatably mounting and supporting said series of cutting disks; power transmitting connections to one of the gears for rotating all the disks; and means for presenting the material to and passing it between the convergent lower portions of the cutting disks.

6. In a slicing machine of the described class, the combination of a frame; a plurality of spaced cutting disks assembled in semi-circular series and in radial planes; annular gears secured on each face of each cutting disk around its center, adjacent gears intermeshing; a plurality of shafts, one shaft in the axis of each cutting disk and of its annular gears forming a journal upon which the disk and its gears turn; a semi-circular series of blocks, the terminal ones resting on the frame and the intervening ones lying between the cutting disks, said blocks receiving and supporting the shafts of the disks; power transmitting connections to one of the gears of the series of cutting disks for rotating all of said disks; and means for presenting the material to and passing it between the convergent lower portions of the cutting disks.

7. In a slicing machine of the described class, the combination of a frame; a plurality of spaced cutting disks assembled in semi-circular series and in radial planes; annular gears secured on each face of each cutting disk around its center, adjacent gears intermeshing; a plurality of shafts one in the axis of and projecting from each side of each disk and its gears, each of said shafts having a central journal portion eccentric to the axis of its end portions and upon which central portion the disk and its gears are mounted to turn; means for turning each shaft in the axis of the disk it supports, to adjust the relative position of said disk in the series; a semi-circular series of blocks, the terminal ones resting on the frame and the intervening ones lying between the cutting disks, said blocks receiving and supporting the projecting ends of the disk shafts; releasable means for fixing the shaft ends in said blocks; power transmitting connections to one of the gears of the series of cutting disks for rotating all of said disks; and means for presenting the material to and passing it between the convergent lower portions of the cutting disks.

8. In a slicing machine, the combination of a series of spaced cutters; a traveling feeder to present the material to and pass it between said disks; and fixed sorting guides beyond the cutters disposed to segregate the slices of the material.

9. In a slicing machine, the combination of a frame; a semi-circular series of rotatable spaced cutting disks disposed in radial planes; a traveling feeder belt to present the material to and pass it between the lower portions of the cutting disks; and a series of separated sorting guides carried by the frame and disposed to receive the slices from the cutting disks and to segregate them.

10. In a slicing machine of the described class, the combination of a plurality of spaced cutting disks assembled in a semi-circular series and in radial planes, annular gears secured on each face of each cutting disk around its center, adjacent gears, intermeshing; means for rotatably mounting and supporting said series of cutting disks, and means for presenting the material to and passing it between the convergent lower portions of the cutting disks.

In testimony whereof we have signed our names to this specification in the presence of two subscribing witnesses.

WILLIAM C. ANDERSON.
ALBERT R. THOMPSON.

Witnesses:
F. R. RUSSELL,
F. E. WEAVER.